US009903502B2

United States Patent
Fuhr et al.

(10) Patent No.: US 9,903,502 B2
(45) Date of Patent: Feb. 27, 2018

(54) FLUID-OPERATED DRIVE

(71) Applicant: Samson Aktiengesellschaft, Frankfurt am Main (DE)

(72) Inventors: Philipp Fuhr, Cologne (DE); Sebastian Krause, Karben (DE); Christof Weigand, Oberursel (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 42 days.

(21) Appl. No.: 14/998,359

(22) Filed: Dec. 23, 2015

(65) Prior Publication Data
US 2016/0178083 A1  Jun. 23, 2016

(30) Foreign Application Priority Data
Dec. 23, 2014 (DE) .................. 10 2014 019 574

(51) Int. Cl.
*F16K 31/122* (2006.01)
*F15B 11/036* (2006.01)
(Continued)

(52) U.S. Cl.
CPC ........ *F16K 31/1225* (2013.01); *F15B 11/036* (2013.01); *F15B 15/1409* (2013.01);
(Continued)

(58) Field of Classification Search
CPC .... F16K 31/1225; F15B 15/16; F15B 11/036; F15B 11/123; F15B 15/1409; F15B 20/004
(Continued)

(56) References Cited

U.S. PATENT DOCUMENTS 2,322,517 A * 6/1943 Hose .................. F16K 31/1221
169/17
8,794,589 B2 * 8/2014 Arnold ................ F16K 31/1225
251/14
(Continued)

FOREIGN PATENT DOCUMENTS

DE       2127181       6/1971
DE    19933165 A1    1/2001
(Continued)

OTHER PUBLICATIONS

Machine Translation for DE 19933165.*

*Primary Examiner* — Ian Paquette
(74) *Attorney, Agent, or Firm* — Schiff Hardin LLP

(57) ABSTRACT

In a fluid-operated drive for a field device, the drive being designed to set a control valve of the field device, a fluidically operated basic drive is provided with a basic working chamber loaded fluidically and delimited by a basic drive housing part and by a basic actuating piston guided in the basic drive housing part. At least one supplementary drive is provided with a supplementary working chamber loaded fluidically and delimited by a supplementary drive housing part. The basic drive housing part and the supplementary drive housing part are displaceable in one another in accordance with a piston and chamber arrangement so that a volume of the supplementary chamber changes in the event of a relative movement of the drive housing parts.

11 Claims, 12 Drawing Sheets

(51) Int. Cl.
  *F15B 15/14* (2006.01)
  *F15B 20/00* (2006.01)
  *F15B 15/16* (2006.01)
  *F15B 11/12* (2006.01)
(52) U.S. Cl.
  CPC ............ F15B 15/16 (2013.01); F15B 20/004 (2013.01); *F15B 11/123* (2013.01)
(58) Field of Classification Search
  USPC .............................. 251/62, 63.4, 63.5; 92/62
  See application file for complete search history.

(56) References Cited

U.S. PATENT DOCUMENTS

| | | | |
|---|---|---|---|
| 2008/0011974 A1* | 1/2008 | Brenes | F16K 31/1225 251/333 |
| 2011/0247484 A1* | 10/2011 | Kiesbauer | F15B 15/1476 91/361 |
| 2013/0234055 A1* | 9/2013 | Young | F16K 31/122 251/62 |

FOREIGN PATENT DOCUMENTS

| | | |
|---|---|---|
| DE | 102004045011 A1 | 4/2006 |
| EP | 0468788 A1 | 2/1992 |
| JP | 59121205 A | 7/1984 |
| JP | 5332328 B2 | 11/2013 |
| JP | 5676706 B2 | 2/2015 |
| WO | 2012/073172 A1 | 6/2012 |

* cited by examiner

US 9,903,502 B2

FLUID-OPERATED DRIVE

BACKGROUND

The disclosure relates to a fluid-operated drive, particularly an actuating drive, such as a pneumatic or hydraulic drive, for a field device of a processing plant, such as a chemical plant, particularly petrochemical plant, a power station, a brewery or the like.

Such drives are used to communicate actuating forces to a control valve, such as a regulating or safety valve, in order to set the safety valve to a desired regulating or safety position. For this purpose, the fluidic drive chambers can be connected to a position controller, which conducts a fluidic actuating signal to the drive.

The fluid-operated drive has a basic drive, which is operated fluidically, such as pneumatically or hydraulically, with a basic working chamber, which is to be loaded fluidically, and possibly a return chamber. The basic working chamber is delimited by a basic drive housing part and by a basic actuating piston, which is guided in a fluid-tight manner in the basic drive housing part. By means of the basic drive, which can in particular be coupled to the position controller, a desired control position for the control valve can be set in the event of a corresponding fluidic loading of the basic working chamber and, possibly, the return chamber.

In addition to the fluidic basic drive, a spring-loaded safety mechanism can be provided on the drive, which forces a safety position of the control valve in the event of a corresponding pressure drop. A fluid-operated drive of this type is known from WO 2012/073172 A1, in which a pneumatic basic drive with a basic working chamber and a return chamber is separated from a supplementary drive, which is arranged in series with the basic drive. The supplementary drive has a supplementary actuating piston, which can actuate the basic actuating piston by means of a supplementary actuating rod, if a certain safety operating position is to be assumed by the control valve. The supplementary actuating piston is set by a pressure spring, which is supported on a cover of the drive housing. The actuating forces of the pressure spring for reaching the safety position are released if pneumatic pressure is output into a supplementary pneumatic supplementary working chamber. It has been shown that fluidic drives of this type with a basic drive and a supplementary drive demand a large installation space in the actuating direction and in this respect are not always suitable for use on field devices of processing plants.

SUMMARY

It is an object to overcome the disadvantages of the prior art, particularly to improve a fluid-operated drive of the generic type such that the space requirement thereof is reduced considerably, without accepting a performance limitation.

In a fluid-operated drive for a field device, the drive being designed to set a control valve of the field device, a fluidically operated basic drive is provided with a basic working chamber loaded fluidically and delimited by a basic drive housing part and by a basic actuating piston guided in the basic drive housing part. At least one supplementary drive is provided with a supplementary working chamber loaded fluidically and delimited by a supplementary drive housing part. The basic drive housing part and the supplementary drive housing part are displaceable in one another in accordance with a piston and chamber arrangement so that a volume of the supplementary chamber changes in the event of a relative movement of the drive housing parts.

DESCRIPTION OF EXEMPLARY EMBODIMENTS

Figure 1A:
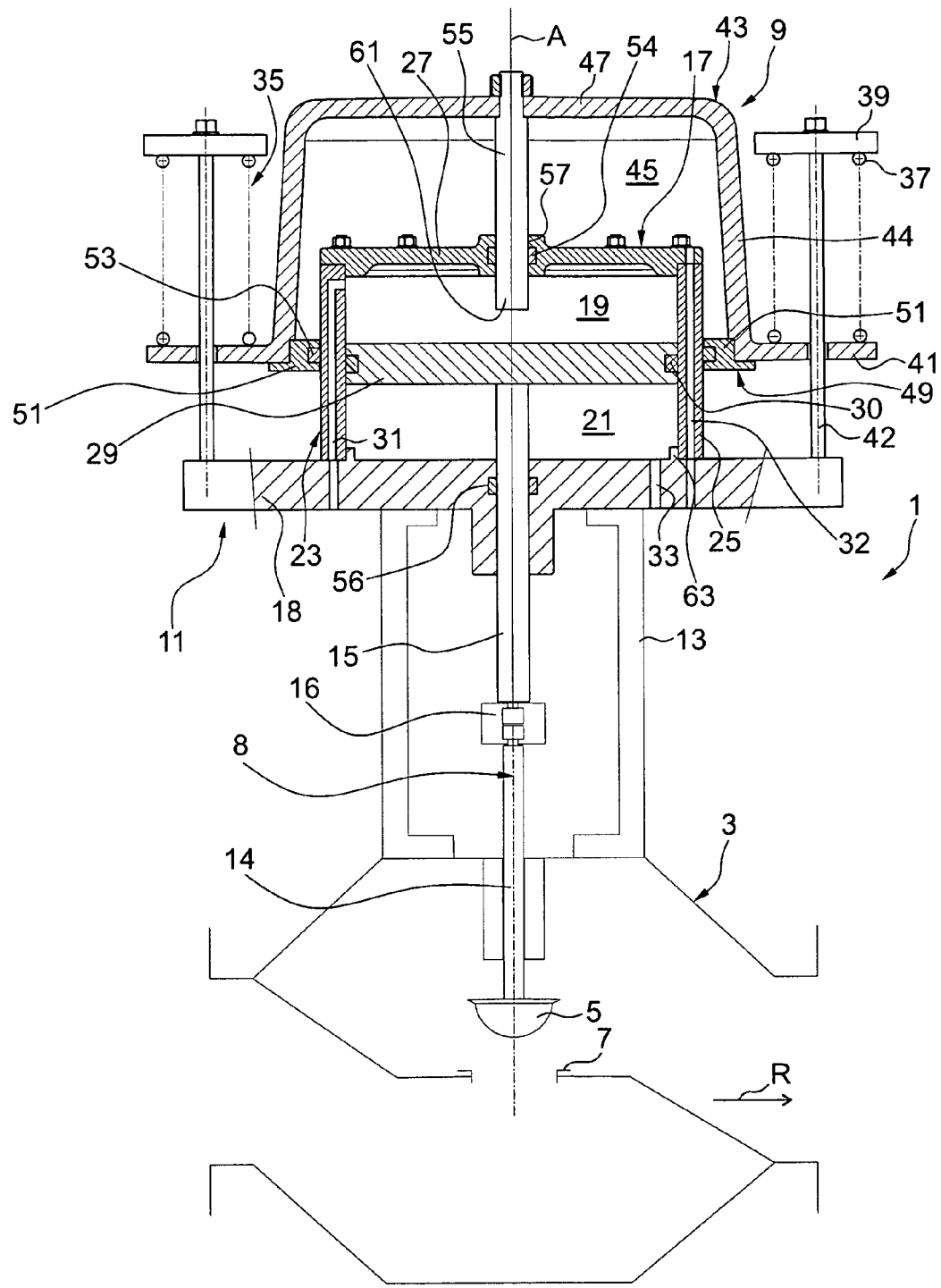
FIG. 1a shows a schematic cross-sectional view of a field device according to an exemplary embodiment having a pneumatic drive according to the exemplary embodiment with a safety function in a first operating position.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in illustrated embodiments and such further applications of the principles of the invention as illustrated as would normally occur to one skilled in the art to which the invention relates are included herein.

A fluid-operated actuating drive, such as a pneumatic or hydraulic actuating drive, is provided for a field device of a processing plant, as described above. The drive has a basic drive, which is operated fluidically, such as pneumatically or hydraulically, with a basic working chamber, which is to be loaded fluidically and is delimited by a basic drive housing part and by a basic actuating piston, which is guided in a fluid-tight manner in the basic drive housing part. In addition to the basic working chamber, the basic drive can also have a basic return chamber, which is separated in a fluid-tight manner from the basic working chamber by the basic actuating piston, so that a pressure difference between the basic working chamber and the pressure control chamber is accompanied by a displacement of the basic actuating piston, which can be coupled or which is coupled to the control valve by means of an actuating rod. It is clear that instead of a return chamber, which is to be loaded fluidically, a forced returner can also be provided, which can act on the side opposite the working-chamber side of the basic actuating piston, for example.

Furthermore, the drive according to the exemplary embodiment has at least one supplementary drive with a supplementary working chamber, which is to be loaded fluidically and which is delimited by a supplementary drive housing part and which is in particular different from the basic reset chamber. The supplementary working chamber, when it is loaded with a fluidic actuating pressure, provides an actuating force, which is directionally aligned with the basic actuating force generated in the basic working chamber by means of fluid pressure, particularly with regards to the linear closing or opening actuating direction of the actuating drive. This means that a directionally aligned displacement of the control valve in a closing or opening direction is achieved by increasing or reducing the fluid pressure in a working volume of the supplementary working chamber precisely as in the working volume of the basic working chamber. The basic working chamber and the supplementary working chamber are supplementary with respect to the respectively generated actuating force, wherein different actuating force values can be generated in a drive-dependent manner. The supplementary drive can have a supplementary return chamber, which is to be loaded fluidically, in addition to its supplementary working chamber. The supplementary return chamber can be directionally aligned with the basic return chamber of the basic drive. In case that both the basic drive and the supplementary drive should each have a basic and a return chamber, the fluid-operated drive is also termed a double-action fluid drive, in which the direction of action of the respective working chambers on the one hand and the return chambers on the other hand are directionally aligned.

The supplementary drive is decoupled from the basic drive with respect to the fluidic pressure loading, so that the supplementary drive can communicate independent supplementary-drive force values to the control valve, which have the same direction of action as the forces of the basic drive, however. The forces, which are formed by the return mechanism with the return chambers, are diametrically opposed to the drive forces of the basic drive and the supplementary drive.

Supplementary drive forces can for example be generated in that a prestressed pressure spring constantly acts on the supplementary drive housing part, which can for example be loosely coupled to the control valve in a driving manner via an supplementary actuating rod, wherein the basic actuating piston of the basic drive, which can be separated from the supplementary actuating rod, can be arranged between the supplementary actuating rod and the control valve. The basic actuating piston can be loosely coupled in a driving manner to the supplementary actuating rod and correspondingly decoupled. The basic actuating piston fluidically separates the basic working chamber from the return chamber of the basic drive. The supplementary actuating rod can also be realized by means of an alternative force-transmission element, which can realize a loosely, driving coupling and decoupling of the supplementary drive housing part with the control valve. A switching mechanism or a disconnection and connection mechanism can structurally couple the force-transmission element of the supplementary drive to the basic actuating piston and detach it therefrom again.

Alternatively, the supplementary drive force can be realized by fluidic pressure build-up in the supplementary working chamber, which acts on the force-transmission element, in order to transmit the generated supplementary drive forces to the control valve.

In this regard, reference is made to the patent application filed on the same day at the German Patent and Trade Mark Office, with the title "Fluidbetriebener Antrieb einer prozesstechnischen Anlage sowie Verfahren zum Betreiben eines fluidbetriebenen Antriebs einer prozesstechnischen Anlage" (Fluid-operated drive of a processing plant and method for operating a fluid-operated drive of a processing plant), which patent application was filed at the German Patent and Trade Mark Office under the applicant's file number S32733DE on the same day as the present application (official file number of the patent application filed at the same time is: DE 10 2014 019 575.9). With regards to the configuration of a switching mechanism and/or a switching on or off of the supplementary drive, reference is made to the simultaneously filed patent application "Fluidbetriebener Antrieb einer prozesstechnischen Anlage sowie Verfahren zum Betreiben eines fluidbetriebenen Antriebs einer prozesstechnischen Anlage" (Fluid-operated drive of a processing plant and method for operating a fluid-operated drive of a processing plant), which patent application was filed at the German Patent and Trade Mark Office under the applicant's file number S32733DE on the same day as the present application (official file number of the patent application filed at the same time is DE 10 2014 019 575.9). The disclosure content of the application filed at the same time is incorporated for the present application with this reference.

According to the exemplary embodiment, the basic drive housing part and the supplementary drive housing part can be displaced or moved inside one another as a piston/chamber arrangement, so that the volume of the supplementary working chamber changes in the event of a relative movement of the drive housing parts. The relative movement of the drive housing parts can consequently be effected by means of fluid pressure change within the supplementary working chamber. In this case, the movable drive housing part can be coupled to the control valve, in order to communicate the actuating forces, which can be transmitted during the movement, to the control valve. If, for example, the supplementary drive housing part can be moved with respect to a stationary basic drive housing part, then the supplementary drive housing part can be coupled to the control valve, wherein the basic drive can of course likewise set the control valve using its own basic actuating piston, independently of the operation of the supplementary drive. Alternatively, the basic drive housing part can be movable with respect to a stationary supplementary drive housing part, as a result of which a control valve movement is realized either by means of the displacement of the entire basic drive, namely the basic drive housing part and the basic actuating piston, immovably fastened thereon, or by means of direct, driving access to the basic actuating piston.

One idea, according to an exemplary embodiment, therefore is comprised in that either the basic drive housing part or the supplementary drive housing part functions as movable drive piston, while the respectively other drive housing part is constructed as a chamber, such as a cylinder. In this respect, the basic drive part or the supplementary drive housing part carries out a double function, on the one hand a cylinder function for the fluidic pressure build-up in the fluidic working chamber of its own drive, and on the other hand a piston function for the respectively other drive. This may mean that the basic drive housing part internally delimits the basic working chamber, i.e. the cylinder, in which the drive-side basic actuating piston is guided, and externally, as a piston varies the volume of the supplementary working chamber, which is delimited in the manner of a cylinder by the inner side of the supplementary drive housing part. A substantially more compact fluid-operated drive is thus achieved by the exemplary embodiment.

In a preferred exemplary embodiment, of the basic drive has a basic return chamber, which is to be loaded fluidically, such as pneumatically or hydraulically, and which is separated from the basic working chamber by the basic actuating piston, and during the loading of which return forces are generated orientated diametrically opposite to the basic drive forces of the basic working chamber. Alternatively or additionally, the supplementary drive can have a supplementary reset chamber, which is to be loaded fluidically and which is separated from the supplementary working chamber by a supplementary actuating piston, which is fastened on the basic drive housing part. The return forces resulting from the loading of the supplementary working chamber are directionally aligned with the return forces of the return chamber of the basic drive.

In an alternative or additional development of the exemplary embodiment, the supplementary drive can have a force actuator, such as a spring, for example a pressure spring. The force returner acts in such a manner on the supplementary drive housing part that it is set depending on the fluid pressure prevailing in the supplementary working chamber relative to the basic drive housing. In the coupled state of the supplementary drive housing part with the control valve, the supplementary drive actuating forces are communicated to the control valve. Should the supplementary drive housing part not (yet) be coupled to the control valve in a force transmitting manner, the displacement is continued, depending on the fluid pressure in the supplementary working chamber, until the coupling state is assumed, in order to transmit the supplementary drive actuating forces to the control valve. The force actuator serves as a force storage, which induces a displacement of the supplementary drive housing part relatively to the basic drive housing part, depending on the fluid pressure in the supplementary working chamber.

Preferably, on one side, the force actuator is supported on an external side of the supplementary drive housing part. On the other side, the force actuator is supported on a counter bearing of the drive, which is stationary relative to the supplementary drive housing part. The force actuator is preferably not arranged in any of the chambers, such as the basic working chamber, the basic return chamber, the supplementary working chamber or the supplementary return chamber, but lies outside an overall housing of the drive, that is, on the outside thereof. In this manner, the actuator position in which the supplementary drive is situated can be shown to an operator.

In a development of the exemplary embodiment, a fluid-tight guide is provided between the basic drive housing part and the supplementary drive housing part for the piston/chamber arrangement of the drive housing parts. The piston/chamber arrangement between the additional drive housing part and the basic drive housing part can be implemented using a sliding bearing, which is at the same time fluid-tight, in order to seal off the supplementary working chamber as well. The fluid-tight guide can be formed by a dynamic seal, such as a sealing ring, between a housing part outer side and a housing part inner side. The seal can preferably be accommodated in a separate bearing ring, fastened to the basic drive housing part or to the supplementary drive housing part and which is preferably exchangeable or produced in one piece with one of the drive housing parts in a loss-proof manner.

In a preferred exemplary embodiment, the supplementary drive housing part and the basic drive housing part are telescopically displaceable inside one another, wherein both drive housing parts in particular are cylindrical, at least on the concentric housing part sides that face each other. The supplementary drive housing part preferably surrounds the basic drive housing part in a radial, in particular concentric, manner, so that the basic drive housing part can occupy and vacate the supplementary working chamber in a piston-like manner. The basic drive housing part can be fastened in a stationary manner on the overall drive housing, while the supplementary drive housing part is movable, or vice versa.

In a preferred exemplary embodiment, the basic drive housing part or the supplementary drive housing part is fastened to a support part, such as a housing part, of the drive that is stationary or fixed to the system and can be coupled fixedly to the control valve housing in particular by means of a support, such as a lantern or yoke.

In a development of the exemplary embodiment, the supplementary drive housing part, which is mounted such that it can move relative to the basic drive housing part, has a driver for coupling the supplementary drive housing part to and decoupling it from the control valve. The driver can be brought into, in particular loose, driving engagement with a driving stop, which is fastened to an actuating rod, via which the control valve is actuated. The driving stop can be either the basic actuating piston of the basic drive itself or a radially projecting component, which is additionally attached to the actuating rod and can be brought into driving engagement with the driver. The driver can be a supplementary actuating rod, fastened to the supplementary drive housing part and extending into the interior of the supplementary drive housing part and additionally projects into the interior of the basic working chamber via an opening in the basic drive housing part. Alternatively, the driver can be attached to the outside of the supplementary drive housing part and extends in particular past the outside of the basic drive housing part as far as the control valve.

In a preferred exemplary embodiment, a supplementary actuating rod, which is fastened to the supplementary drive housing part, extends in the interior of the supplementary drive housing part through a passage made in the basic housing part, wherein the supplementary actuating rod is guided in a fluid-tight, movable manner in the passage. Furthermore, the additional actuating rod can have a stop end situated in the basic working chamber which can be brought into a loose engagement with the basic actuating piston in order to transmit an supplementary actuating force of the supplementary drive to the control valve in a driving manner.

In a development of the exemplary embodiment, the supplementary drive housing part has a cylindrical inner side, which is at least partially opposite a cylindrical outer side of the basic drive housing, wherein the cylindrical sides preferably lie concentrically to a longitudinal axis, along which an actuating rod is moved, which is coupled or which can be coupled to the control valve.

Furthermore, the exemplary embodiment relates to a field device, in particular an actuator, for a processing plant. The field device has a fluid-operated drive according to the exemplary embodiment as defined above and a control valve, which is coupled in a force-transmitting manner to the drive.

Further properties, advantages and features of the exemplary embodiment are explained by way of the following description of preferred exemplary embodiments in the drawings.

Figure 1B:
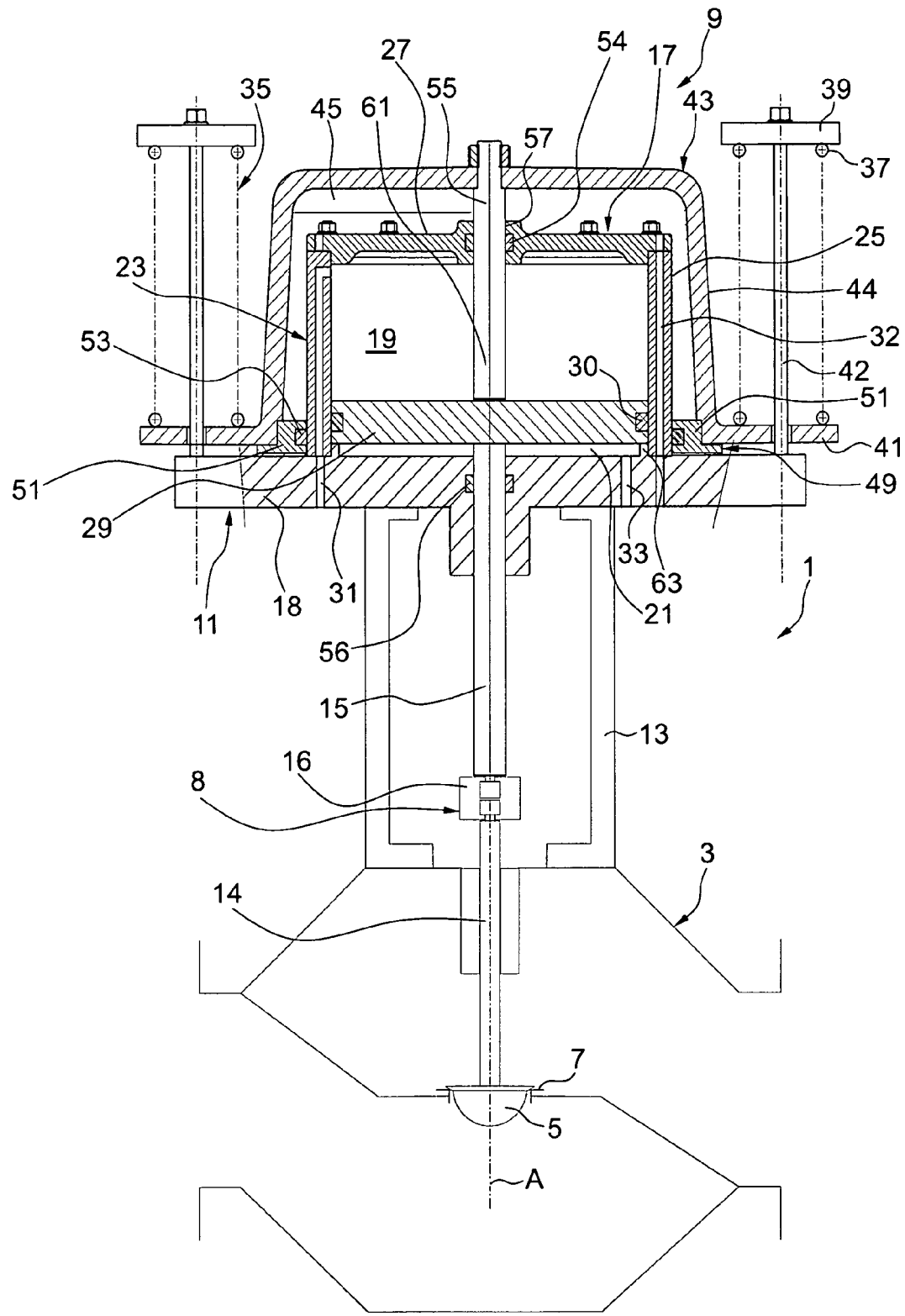
FIG. 1b shows a schematic cross-sectional view of the field device according to the exemplary embodiment of FIG. 1a in a regulated closed position.
Figure 1C:
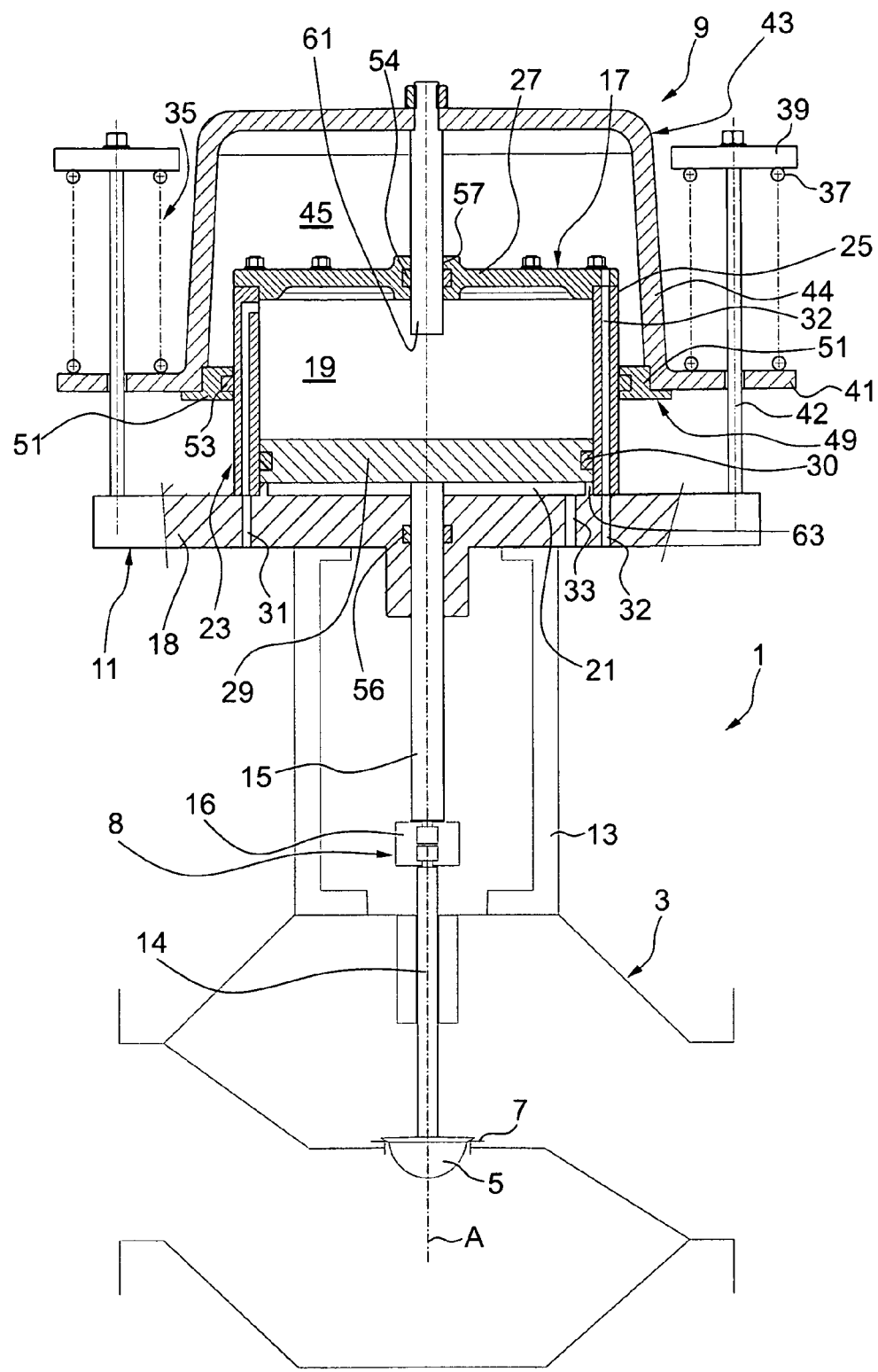
FIG. 1c shows a schematic cross-sectional view of the field device according to the exemplary embodiment of FIGS. 1a and 1b in a forced, closed safety position.

In FIGS. 1a to 1c the field device according to the exemplary embodiment is generally provided with the reference number 1. The field device 1 is used in processing plants, such as chemical plants, and acts to set and regulate process flows through a pipeline system of the plant. For this purpose, the field device 1 has a control valve 3, which is a globe valve in the examples shown. Of course, rotary or pivoting drives with corresponding conversion gears can also be used. The corresponding regulation routines, in which for example the control variable is the position, process flow or the like, are implemented by means of a position controller (not shown in detail), which is connected pneumatically to the respective working chambers via access channels.

The control valve 3 has a valve member 5 that can be opened and closed relative to the valve seat 7. The valve member 5 is coupled via a divided actuating rod 8 to the pneumatic drive 9 according to the exemplary embodiment by means of a rod connector 16 such that actuating force is transmitted to a drive housing 11, which is stationary or fixed to the plant. The pneumatic drive 9 is supported on the housing of the control valve 3 by means of a yoke 13. The actuating rod 8 has an actuating rod part 14 on the valve side and an actuating rod part 15 on the drive side, which is guided in a fluid-tight manner by a control-valve-side base cover 18 of the stationary overall housing 11. For this purpose, a sealing ring 56 is set in a recess in the base cover passage of the drive-side actuating rod part.

The pneumatic drive 9 according to the exemplary embodiment has a pneumatic basic drive 17 including a basic working chamber 19 and a basic reset chamber 21. Both chambers 19, 21 of the basic drive 17 are delimited by a cylindrical basic drive housing part 23, a cylindrical outer case 25 forming the radial boundary, while an upper basic cover 27 and the base cover 18 of the control-valve-side overall housing part delimit the chambers 19, 21 axially.

A basic actuating piston 29 is guided in a fluid-tight manner inside the cylindrical basic housing part 23 via a ring seal 30, which pneumatically decouples the two chambers 19, 21 from each other in every actuating position.

The basic working chamber 19 has a pneumatic access channel 31, via which a pneumatic load can be applied to the basic working chamber 19. At least partially the access channel 31 for the basic working chamber 19 is introduced in the cylindrical outer case 25 of the basic drive housing part 23. The basic return chamber 21 also has an access channel 33, via which basic return chamber 21 can be actuated pneumatically. The access channel 33 for the basic return chamber 21 is inserted in the base cover 18 of the overall housing 11. If a pressure difference is generated between the two chambers 19, 21, the basic actuating piston 29 moves, and thus the actuating rod 7 and the valve member 5 move accordingly. The pressure difference can be set by a position controller (not shown in detail), which can be connected to the access channels 31, 33. The basic actuating piston 29 can move in the actuating opening direction as far as the stop with the supplementary rod 55 without being affected by the supplementary drive 35.

Furthermore, the pneumatic drive 9 has the supplementary or additional drive 35, which has compression springs 37, in particular safety compression springs, as force stores. The compression spring 37 is supported on one side (at the top) on a stationary support plate 39 coupled to the overall housing 11 fastened to a guide rod 42. The guide rod 42 extends parallel to the axial actuating direction A and is fastened to the stationary base cover 18. On the output side, the pressure spring or compression spring 37 is supported on an annular flange 41 of a supplementary drive housing part 43 having a substantially truncated cone shape. The annular flange 41 extends primarily in the radial direction R from the case section 44, which has a slight truncated cone shape on the outside and the inside, of the supplementary drive housing part 43, which delimits a pneumatically loaded supplementary working chamber 45 to the radial outside. The supplementary or additional working chamber 45 is closed on an axial side by a cover part 47 of the supplementary or additional drive housing part 43. On the control valve side, the supplementary working chamber 45 is pneumatically closed by a piston chamber sliding bearing 49, which is implemented by a separate bearing ring 51 and a sealing ring 53 accommodated therein. The bearing ring 51 is fastened to the inside of the supplementary drive housing part 43, substantially at the height of the annular flange 41. With this bearing 49, the supplementary drive housing part 43 can slide on a cylindrical outer side of the cylindrical outer case 25 of the basic drive housing part 23 in the manner of a cylinder and piston, as a result of which the volume of the supplementary working chamber 45 changes.

In FIG. 1a, maximum load (for example 6 bar) is applied to the supplementary working chamber 45, as a result of which the stored spring forces of the compression spring 37 are held. If the pneumatic pressure is then eliminated gradually or continuously via a control or access channel to the supplementary drive housing part 43, the compression spring 37 moves the supplementary drive housing part 43 and thus a supplementary or additional actuating rod 55, which is fastened rigidly to the housing cover 47 such that it coincides with an axial actuating direction A. The supplementary actuating rod 55 slides through a sealed opening 57 in the basic cover 27 in the interior of the basic working chamber 19 and comprises a control-valve-side driver end 61, which can be brought into a loose driving stop with the basic actuating piston 29.

It can be seen in FIG. 1a that the stop end 61 of the supplementary actuating rod 55 comes closer to the basic actuating piston 29 as the reduction in the pneumatic internal pressure in the supplementary working chamber 45 progresses.

FIG. 1b shows a safety position of the actuating device 1, in which the supplementary actuating rod 55 has driven the basic actuating piston 29 in the axial actuating closing direction A and forced it into an end position defined by the stop pegs 63 arranged in the interior of the return chamber 21. The safety position is achieved by completely releasing the spring forces of the compression spring 37, which are transmitted via the supplementary actuating rod 55 to the basic actuating piston 29. At the same time, the access channel 33 of the basic return chamber 21 is open in order to avoid build-up of a pneumatic counter pressure in the basic return chamber 21. To achieve the safety position as shown in FIG. 1b, the access channel 32 for the supplementary working chamber 45 and the access channel 33 for the basic return chamber 21 are ventilated.

If FIGS. 1a and 1b are compared, it can be seen how the supplementary drive housing part 43 is displaced telescopically and concentrically to the basic drive housing part 23 in the axial actuating direction A into the closed position.

If a pneumatic pressure is then built up again in the supplementary working chamber 45, the supplementary actuating rod 55 moves out of its driving engagement with the basic actuating piston 29, as a result of which the basic drive 17 is again able to actuate the control valve 3 normally in both actuating directions A. When the supplementary actuating rod 55 is retracted, the supplementary drive housing part 43 and the basic drive housing part 23 acts like piston and cylinder, wherein in this case the cylinder-like supplementary drive housing part 43 is movable relative to the stationary piston-like basic housing part 23.

In FIG. 1c, maximum pneumatic load is applied to the pneumatic supplementary or additional working chamber 45, as a result of which the spring forces of the compression spring 37 are prestressed. In addition, the basic drive 17 is controlled in such a manner that the valve member 5 reaches the closed position for the valve seat 7 in accordance with a regulation routine.

In the telescopic arrangement of the supplementary drive 35 and basic drive 17 illustrated in FIGS. 1a to 1c, the supplementary drive is mainly realized by means of a safety spring, the supplementary-drive forces of which can be metered by setting the pneumatic pressure in the supplementary pneumatic working chamber 45. In this case, the supplementary drive 35 overlays the basic drive 17, in case the safety function is triggered, i.e. in that the supplementary working chamber 45 and the basic reset chamber 21 are ventilated.

Figure 2A:
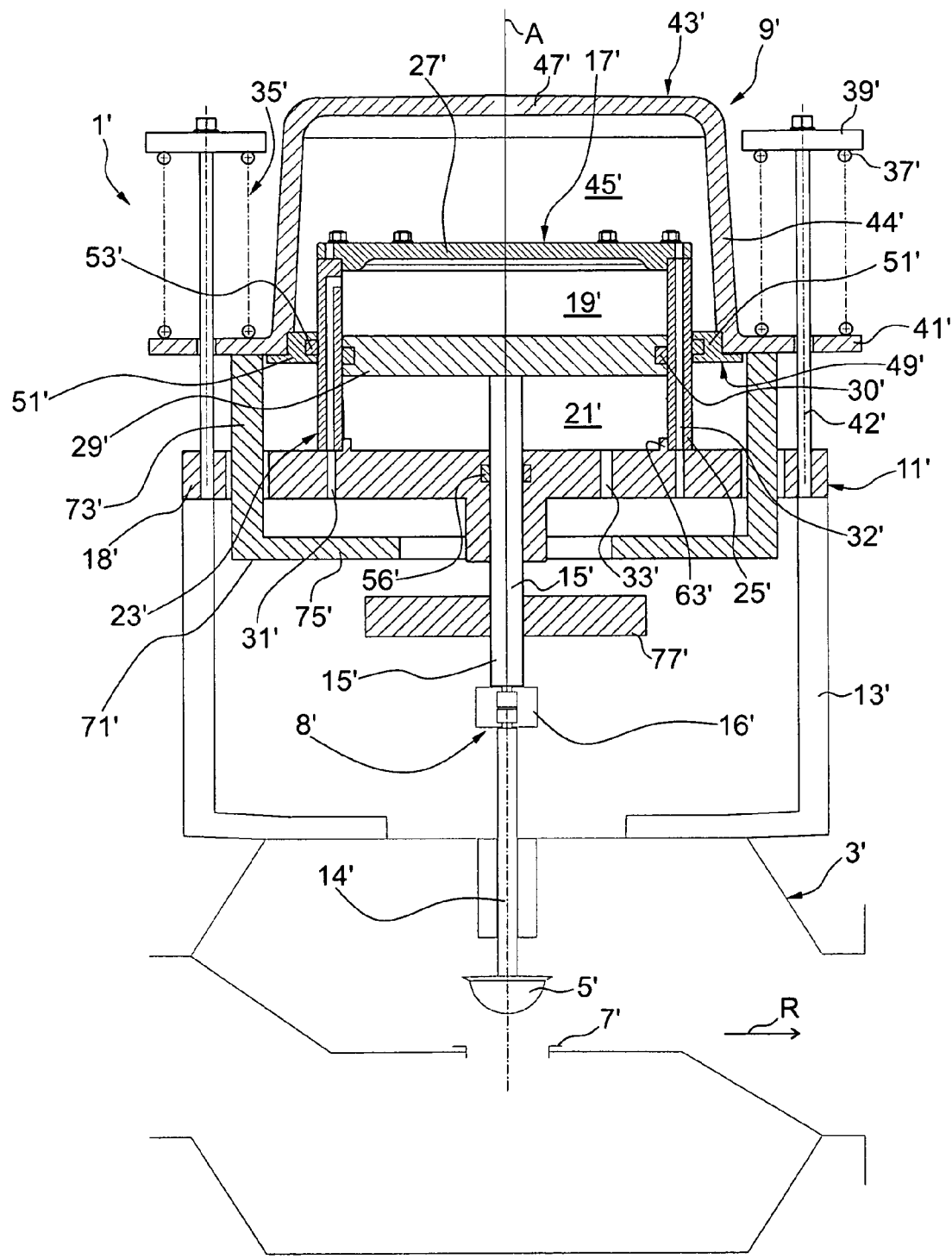
FIG. 2a shows a schematic cross-sectional view of a further exemplary embodiment of the field device having another pneumatic drive according to the exemplary embodiment in a regulated operating position.
Figure 2B:
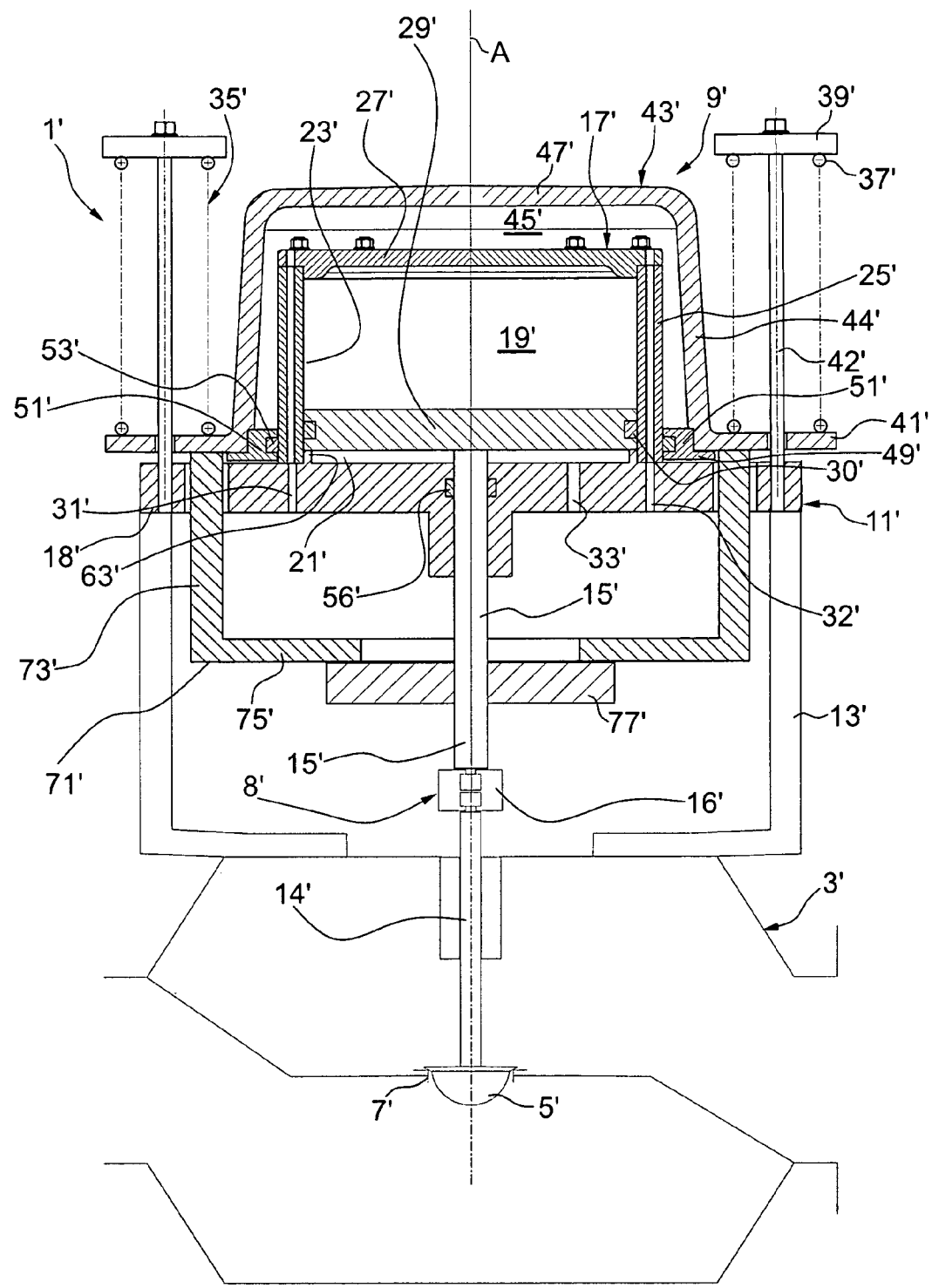
FIG. 2b shows a schematic cross-sectional view of the field device according to the exemplary embodiment of FIG. 2a in a forced safety position.

A further drive embodiment for the field device is illustrated in FIGS. 2a and 2b, which is very similar to the embodiment according to FIGS. 1a to 1c. For better readability of the description of the figures, the same reference numbers are used for the embodiment according to FIGS. 2a and 2b, wherein the reference numbers are provided with a "'".

The drive 9' according to the exemplary embodiment essentially differs from that according to FIGS. 1a to 1c in terms of the design configuration of the driver function of the supplementary drive 35' in relation to the actuating rod part 15'. In contrast to the embodiment according to FIGS. 1a to 1c, the supplementary drive 35' does not have an inner supplementary actuating rod 55', but rather realizes the driver function by means of a driver 71' arranged outside of the supplementary working chamber 45', which is fastened on the annular flange 41'. In cross section, the driver 71' has a centrally open U-shape with an axially extending section 73', which extends through the base cover 18' of the overall drive 11' fastened on the yoke 13'. In this case, the bores in the base cover 18' are realized to be large such that in the event of a translational displacement of the section 73' in the axial actuating direction A, no contact is realized between the base cover 18' and the axial section 73'. In addition, the driver 71' has a radial section 75', which extends up to the actuating rod part 15', on which a counterpart driver 77' in the form of a disc is fastened. The radial extent of the counterpart driver 77' is so large that in the event of a movement of the driver 71' in the axial actuating direction A, the radial section 75' comes into engagement with the counterpart driver 77'.

An operating position, in which the valve member 5' is in the open state, is shown in FIG. 2a. If the supplementary working chamber 45' is ventilated, the pressure springs 37' induce the movement of the supplementary drive housing part 45' and therefore the driver 71', which comes into engagement with the counterpart driver 77' and displaces the same in the axial actuating closing direction A, which leads the valve member 5' into the safe closing position with respect to the valve seat 7'.

In this embodiment, the yoke 13' is realized to be wider such that all components of the driver construction (71', 50', 75') can lie radially inside the yoke structure in a protected manner.

In addition, an opening 57 including a seal 54 is not required on the basic drive housing 23', because no access to the interior of the basic drive 17' is necessary for the driver function.

Figure 3A:
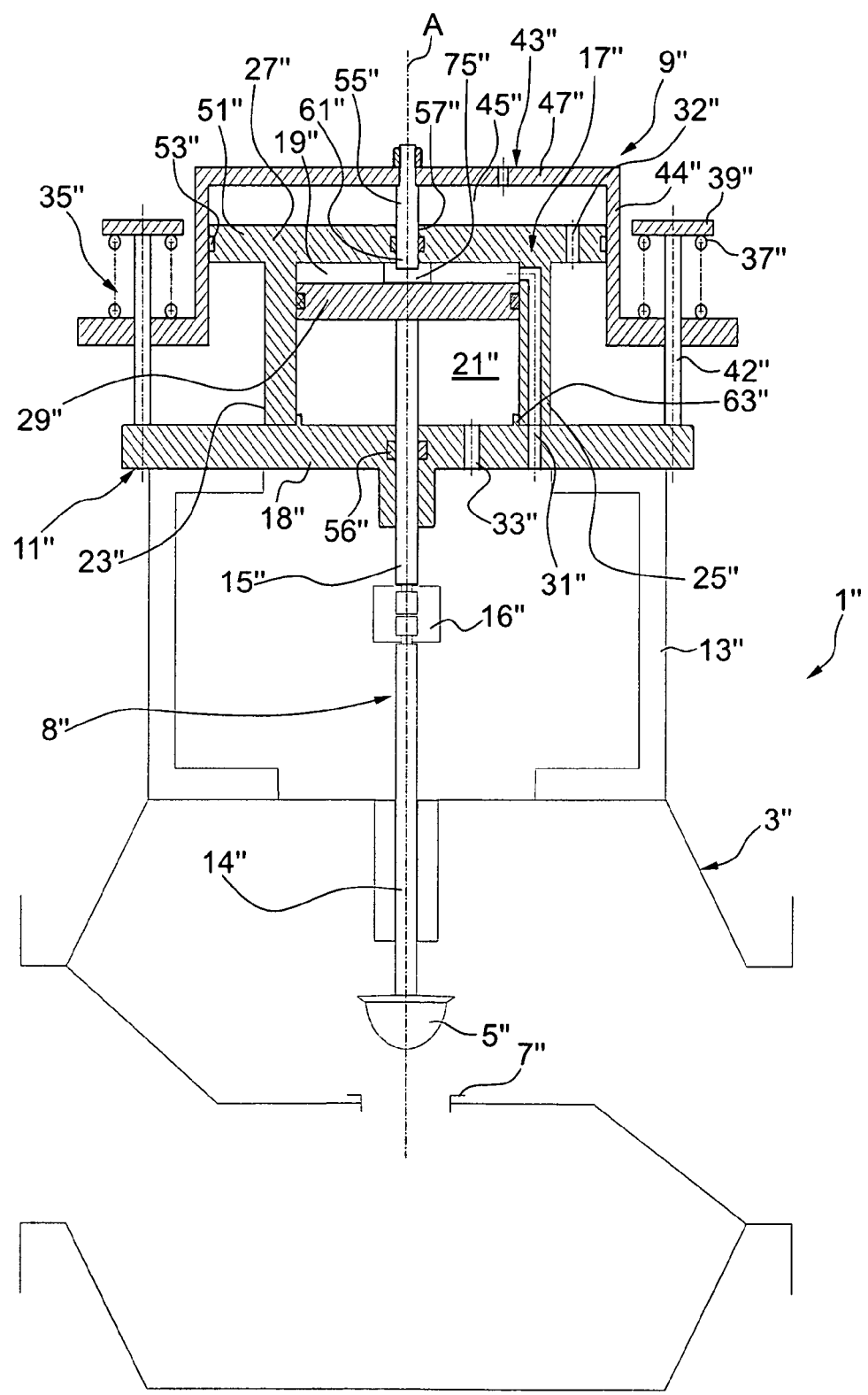
FIG. 3a shows a schematic cross-sectional view of a further exemplary embodiment of a field device having another pneumatic drive according to the exemplary embodiment in a completely opened position of the control valve.
Figure 3B:
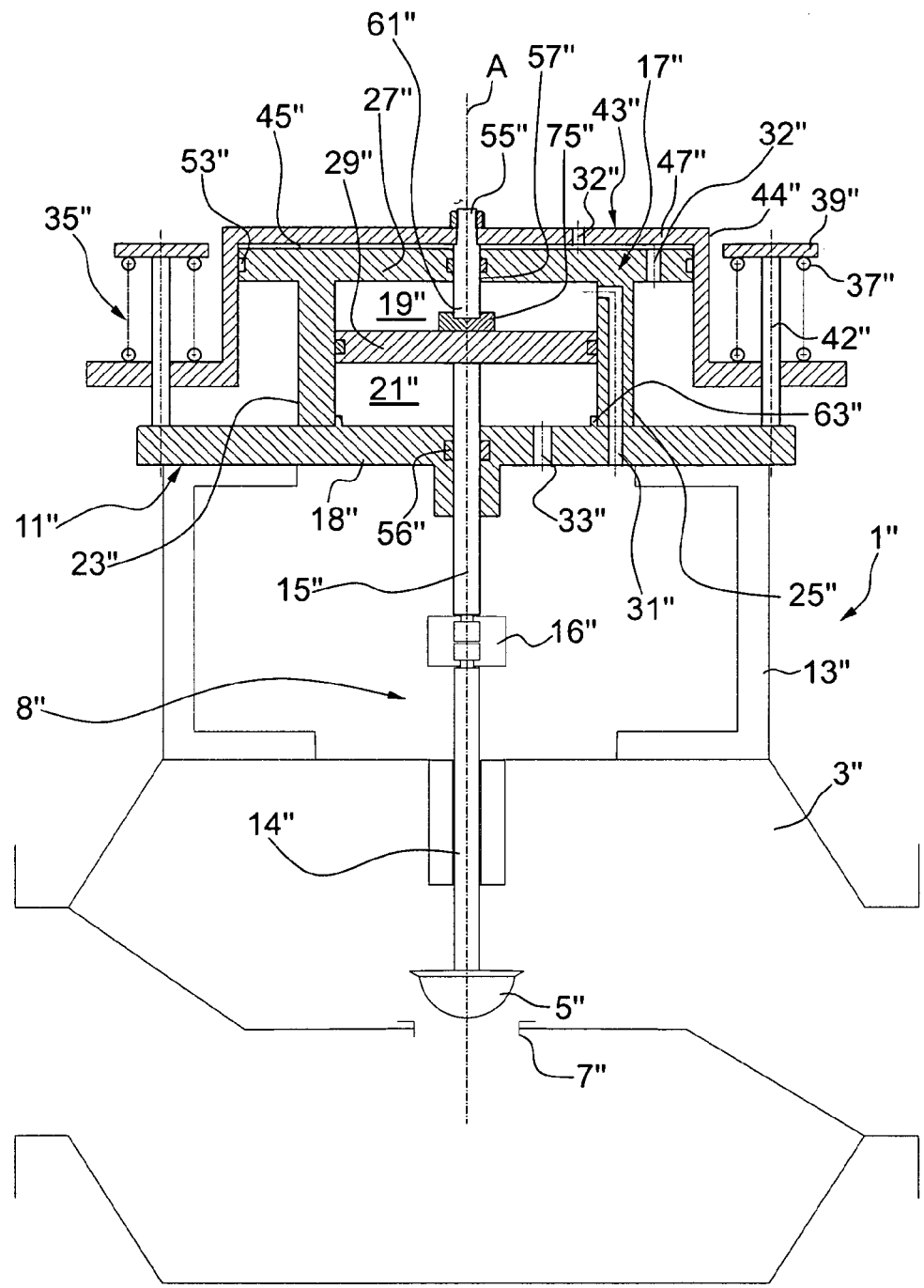
FIG. 3b shows a schematic cross-sectional view of the field device according to the exemplary embodiment of FIG. 3a in a partially opened, regulated position.
Figure 3C:
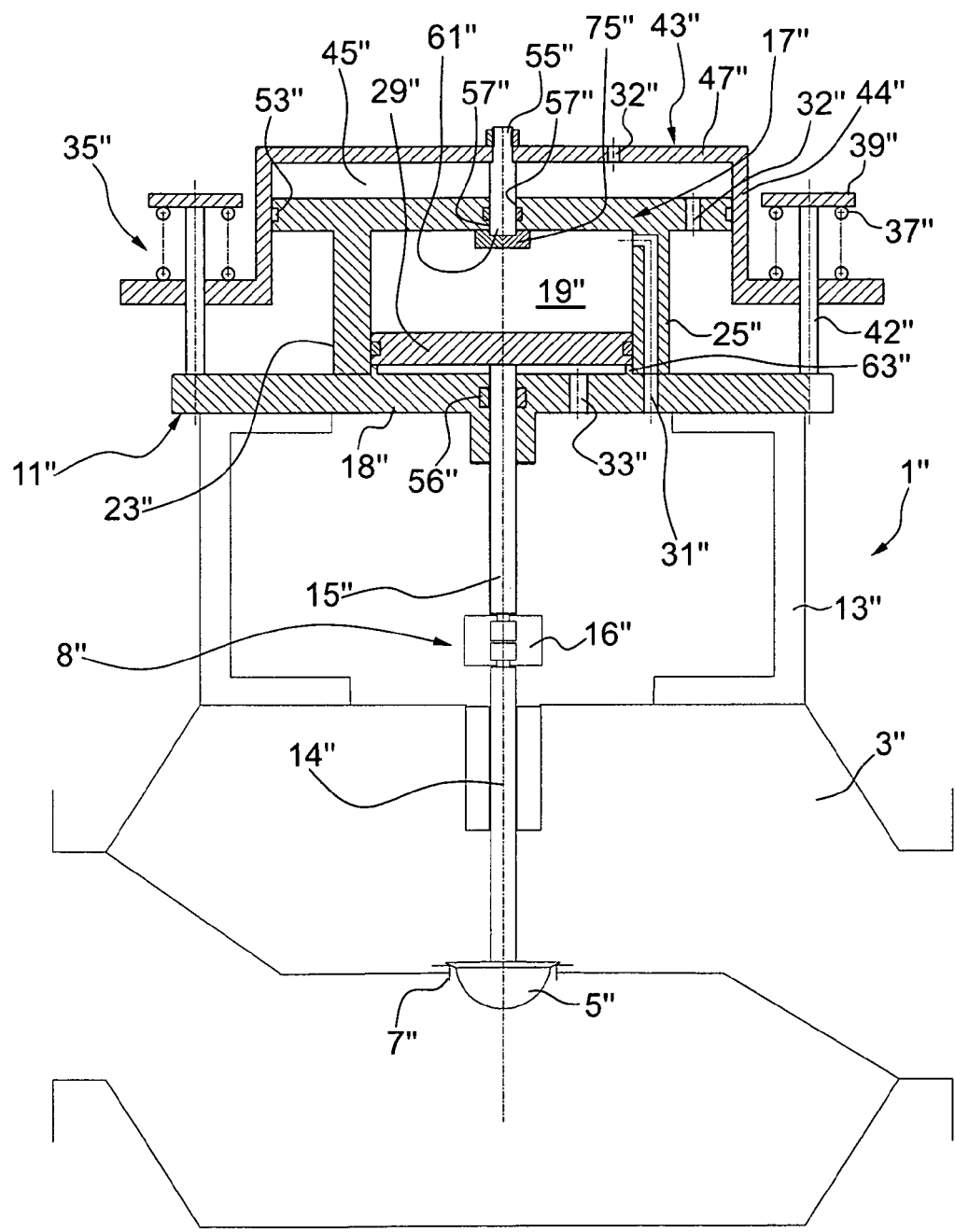
FIG. 3c shows a schematic cross-sectional view of the field device according to the exemplary embodiment of FIGS. 3a and 3b in a regulated closed position.

A further exemplary embodiment of the field device and a drive according to the exemplary embodiment is illustrated in FIGS. 3a and 3b, which is similar particularly to the drive according to FIG. 1 or 2. In particular, the construction of the drive according to the exemplary embodiment according to FIG. 3 is similar to that according to FIG. 1, also with respect to the driving construction. For better readability of the description of the figures, for the same and identical components of the embodiments according to FIGS. 3a to 3c the same reference numerals are used in the embodiment according to FIGS. 1 and 2, wherein either "'''" or "''" are added.

The drive 9" according to the exemplary embodiment according to FIGS. 3a to 3c differs from the embodiment according to FIG. 1 in the configuration of the basic drive housing part 23", in which the basic cover 27", the cylindrical outer case 25", and the bearing ring 51" are produced in one piece, particularly one metal piece. The radially protruding bearing ring 51" holds the sealing ring 53", in order to close the supplementary working chamber 45" on the inner side of the supplementary drive housing part 47" in a fluid-tight manner with respect to the atmosphere.

Furthermore, the access channel 32" for the supplementary working chamber 45" is not realised in the outer case 25" of the basic drive housing part 27", but rather in the annular section 51". In addition, the supplementary actuating rod 55" has a soft damper 75", at its stop end 61" facing the basic actuating piston 29", which soft damper 75" shall prevent a striking driving between the supplementary actuating rod 55" and the basic actuating piston 29".

In FIG. 3a, the control valve 3" is illustrated in an opened position, wherein the supplementary drive 35" is operated in driving engagement with the basic actuating piston 29", in that the damper 45" bears against the basic actuating piston 29". If the pneumatic pressure within the additional working chamber 4" is reduced, spring forces of the pressure spring 37" are released, which effects the actuation of the basic actuating piston 29" in the axial closing actuating direction A.

In FIG. 3b, the additional drive is extended completely in the actuating closing direction A. In this position, the basic drive 17" can then take on the displacement of the valve member 5", in order, for example by means of a pressure increase in the basic working chamber 19", to realize a complete closing of the valve member 5" with respect to the valve seat 7".

In the embodiment according to FIG. 3, the supplementary drive 35" is primarily provided to displace the valve member 5" out of a completely opened position, in which locking forces often act on the valve member which makes displacing the valve member 5" difficult, to an opened central position. The pressing forces achieve the safe unlocking of the valve member, so that a pneumatic regulation by means of a weaker basic drive 17" can subsequently be facilitated.

In the embodiment according to FIGS. 1 to 3, the pneumatic drive is configured with a pressure spring 37, 37', 37", which is used as safety spring, in order to either bring the valve to a safe closed position or to realise a movement out of a locked opened position. Of course, a position regulation of the valve member can also be achieved by corresponding loading of the additional working chamber 45, 45', 45" by means of the supplementary drive 35" within the certain supplementary-drive movement amplitude, which is delimited by the driver engagement range.

In addition, in the embodiment according to FIGS. 1, 2 and 3, the basic drive housing part 23, 23', 23" is arranged stationary with the respect to basic cover 18, 18', 18" of the overall drive 11, 11', 11", which basic drive housing part 23, 23', 23" is fastened via the yoke 13, 13', 13" on the housing of the control valve 3, 3', 3". Because the outside of the basic housing part 27, 27', 27" and the displaceable supplementary drive housing part 47, 47', 47" engage one another in a piston/cylinder-like manner, a simple compact design with a smaller installation space in the axial actuating direction A can be achieved.

A further similar field-device construction, which is provided with a different drive concept, is illustrated in FIG. 4. Because, in spite of that, many components of the two drive concepts are similar, for better readability of the description of the figures, the same reference numbers are used for similar or identical components as in the embodiments according to FIGS. 1 to 3, which reference numbers are provided with "'''".

The drive 9''' according to the exemplary embodiment according to FIGS. 4a to 4d is provided with a double-action pneumatic drive, the safety function of which is no longer forced by means of a mechanical pressure spring 37, 37', 37". Rather, the double-action pneumatic drive 9" according to the exemplary embodiment has a pneumatically acting basic drive 17", which is of approximately identical construction to the drive 17, 17', 17" according to FIGS. 1 to 3.

By contrast, the additional drive 43''' is also a pneumatic drive with the additional working chamber 45''', wherein return forces are realized by an additional return chamber 79''', which is to be loaded pneumatically. Both working chambers 45''' and 75''' of the supplementary drive 43''' are pneumatically isolated from one another by a supplementary or additional actuating piston 81'''. To this end, the supplementary actuating piston 81''' has an annular seal 83''' on its cylindrical circumference.

By contrast with the embodiments according to FIGS. 1 to 3, the basic drive housing part 23''' is not connected in a stationary manner to the yoke 13''' or the valve housing 3''', but rather guided in a manner movable thereto. The basic cover 18''' of the overall drive 11''' is fastened on the yoke 13''', as in the other embodiments according to FIGS. 1 to 3, and at the same time provides the sliding and guide bearing 85''', which has an annular seal 87''', on which the cylindrical outer side 89''' of the basic drive housing part 23''' can slide in a sealing manner. In this manner, the supplementary return chamber 79''' or additional return chamber of the supplementary drive 43''' is pneumatically sealed against atmosphere.

In the embodiments according to FIGS. 4a to 4d, the additional drive housing part 43''' is stationary with respect to the yoke 13''', wherein a large part of the overall drive housing 11''' forms the housing part 43''' of the additional drive 3'''.

Furthermore, the additional actuating piston 81''' is fastened, particularly welded, onto the (movable) basic drive housing part 23''', in order to seal the basic working chamber 19''' of the basic drive 23''' with respect to the additional reset chamber 29'''.

With regards to the axis according to the actuating direction A, a driver protrusion is realized on the side of the supplementary actuating piston 83''' facing the basic actuating piston 29''', which realizes a secure bearing of the basic actuating piston 29''' and at the same time even provides a gap for the basic working chamber 19''' if the basic actuating piston 29''' bears against the supplementary actuating piston 81'''.

The two housing parts 43''' and 23''' are constructed in their axial extent to be cylindrical internally and externally, and designed to be concentric to one another with respect to the axis according to actuating direction A. As can be seen in a comparison of FIGS. 4a to 4d, the basic housing part 23''' can be telescopically retracted and extended in and out of the supplementary drive housing part 47'''.

Figure 4A:
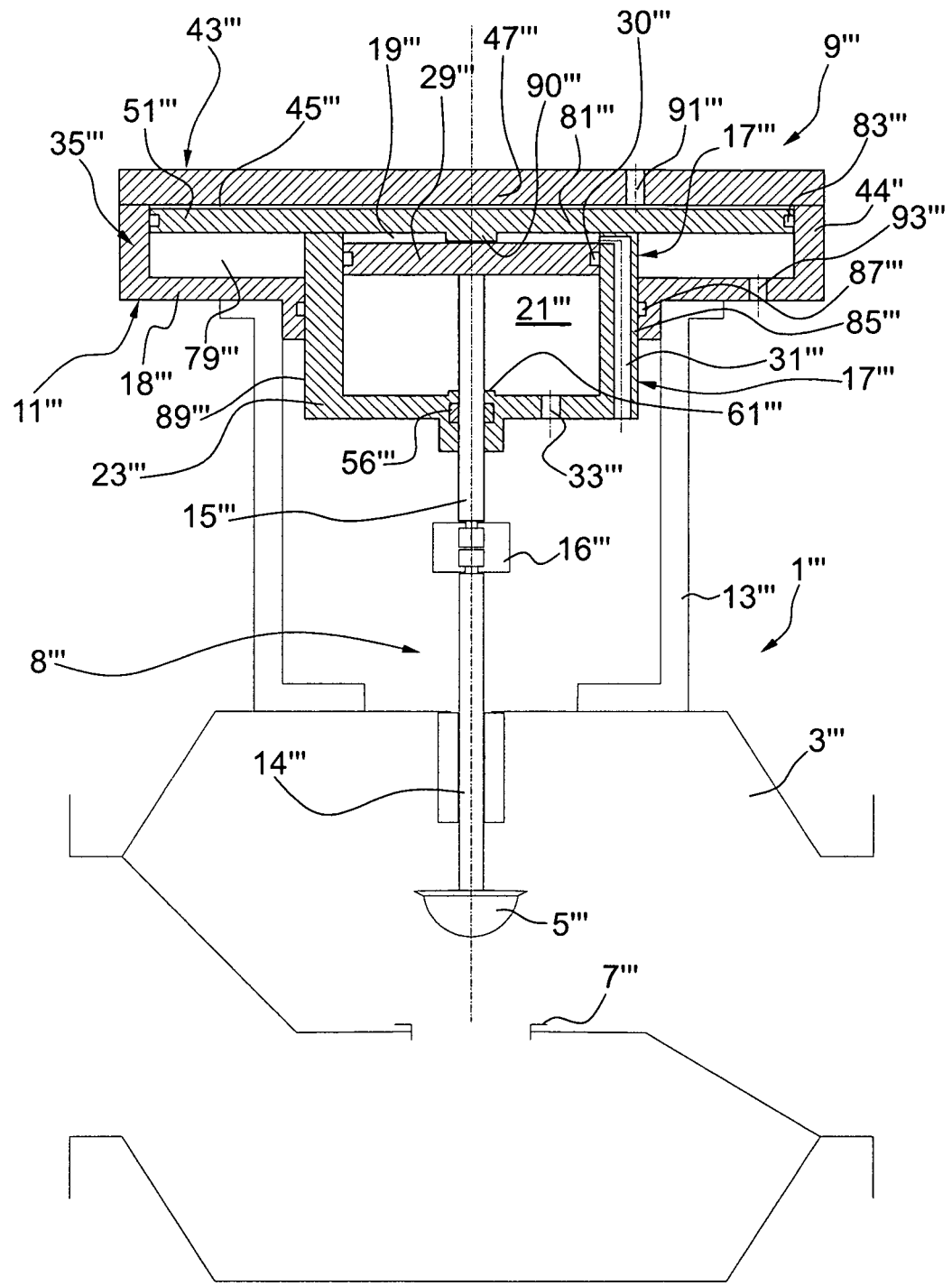
FIG. 4a shows a schematic cross-sectional view of a further exemplary embodiment of the field device having a double-action pneumatic drive in a completely opened position of the control valve.
Figure 4B:
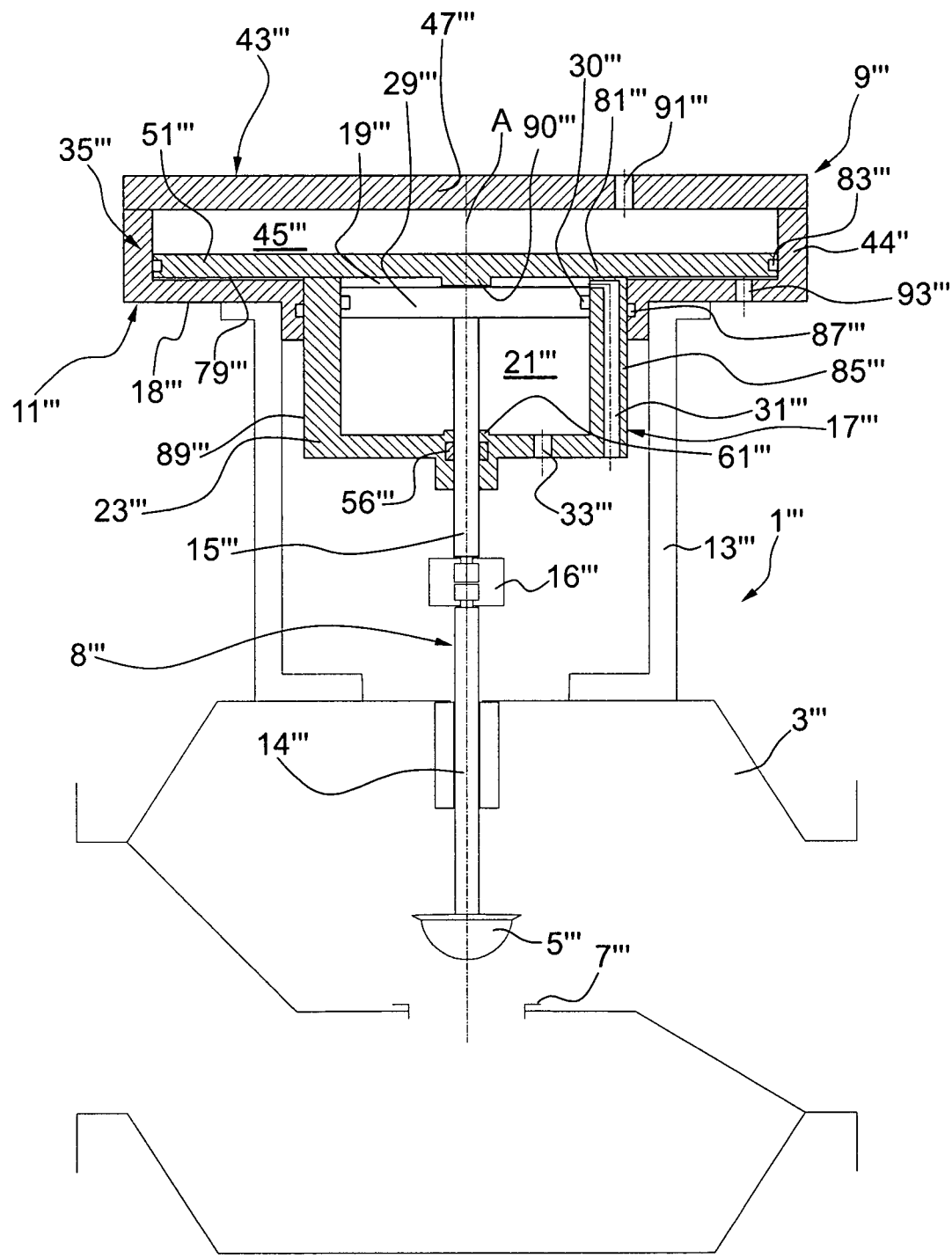
FIG. 4b shows a schematic cross-sectional view of the field device of FIG. 4a, in which the supplementary drive of the double-action pneumatic drive is completely extended in the closing direction.

In FIG. 4a, the drive 9''' is illustrated in the fully retracted position, in which the valve member 5''' is completely open. As already explained above, it may be that the control valve 3''' locks in this operating state, if locking forces have arisen for example due to corrosion. The additional drive 43''', which can provide a considerably greater drive force, can be activated in this operating position, because a particularly large active surface is available at the additional actuating piston 81'''. If, in this case, the additional working chamber 45''' is pneumatically loaded via the access channel 91''' and at the same time the return chamber 79''' is accordingly ventilated via the channel 93''', the actuating rod 15''' moves, particularly by means of the contact of the basic actuating piston 29''' at the step 90''' in the closing direction. The maximum actuating amplitude of the additional drive 43''' is traveled in FIG. 4b, so that the additional actuating piston 81''' hits the additional drive housing part 47'''. From this position, the basic drive 17''' can be turned on, by loading the basic working chamber 19''' with a pneumatic regulating pressure, wherein the return chamber 21''' can at the same time be pneumatically relieved.

Figure 4C:
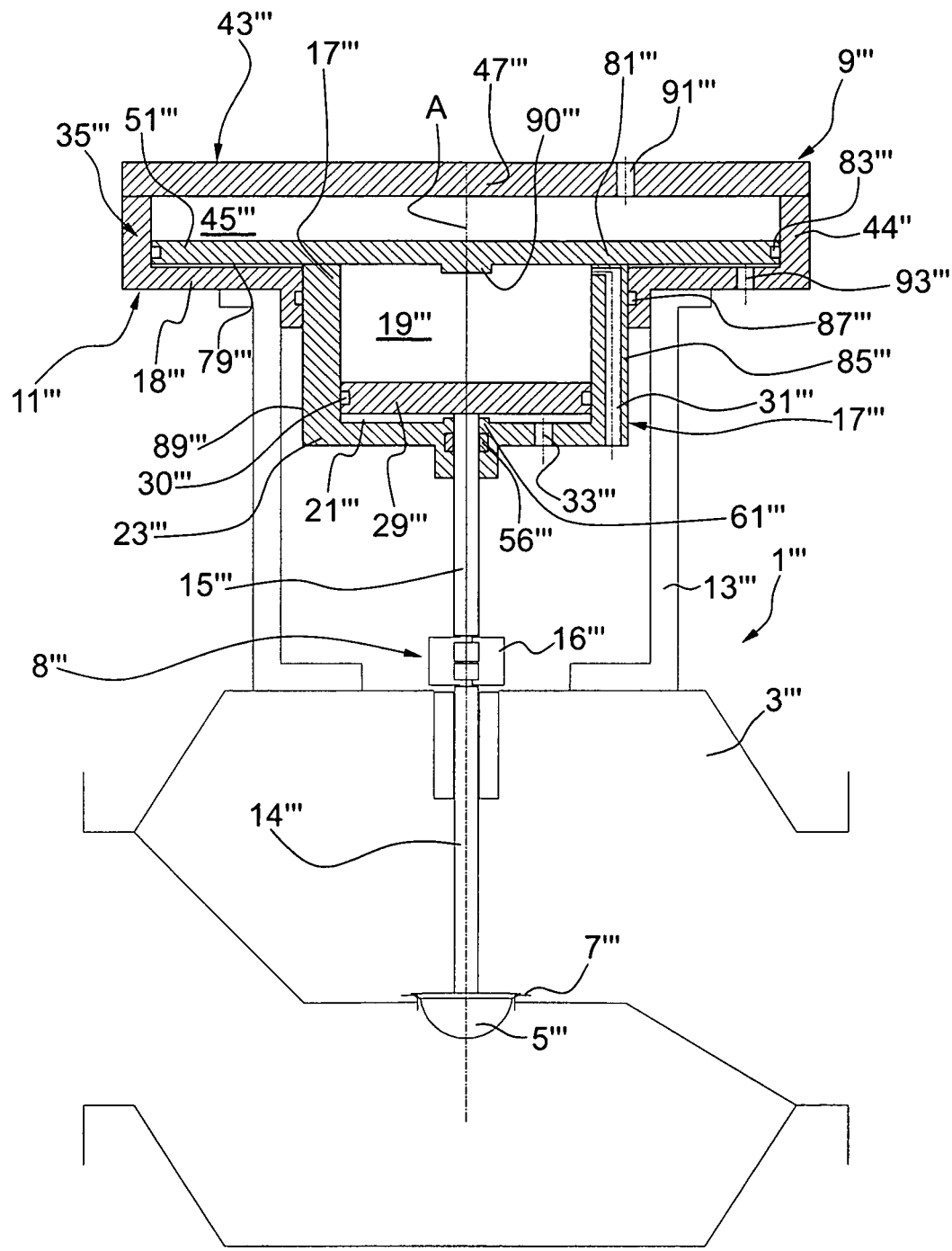
FIG. 4c shows a schematic cross-sectional view of the double-action pneumatic drive of FIGS. 4a and 4b, in which the control valve is completely closed.
Figure 4D:
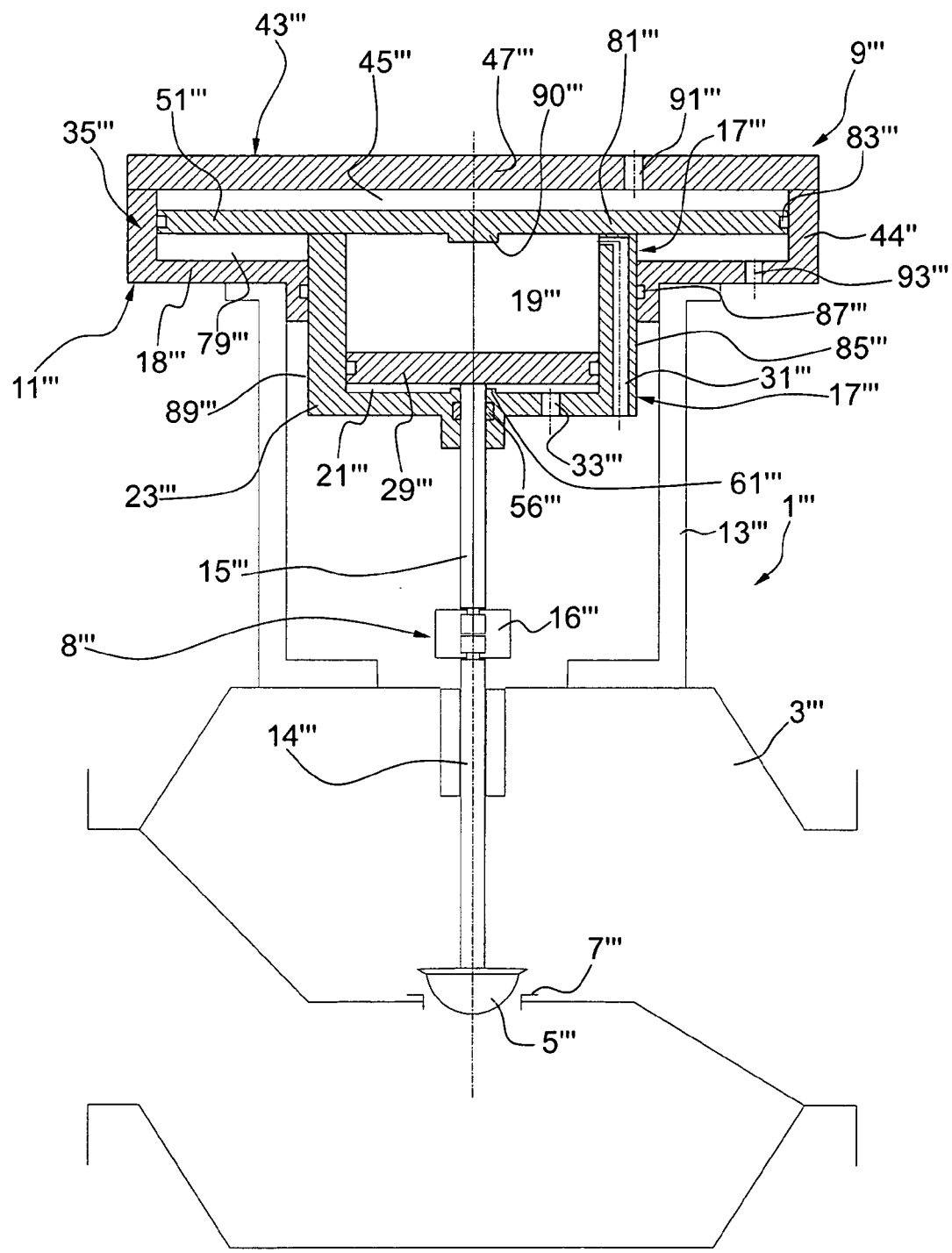
FIG. 4d shows a schematic cross-sectional view of the double-action pneumatic drive of FIGS. 4a to 4c, wherein the pneumatic basic drive is fully extended in the closing direction and wherein the supplementary drive is in regulated operation.

In FIG. 4c, the basic drive 17''' is also fully extended, as a result of which the valve member 5''' is brought into the closed position. In order to lift the valve member 5''' from the valve seat 7''' from this closed position, in which high operating forces possibly act on the valve member 5''', the pneumatic regulating pressure within the supplementary return chamber 79''' of the supplementary drive 73''' can for example be increased, as is illustrated in FIG. 4d. It is to be noted in this case that the pneumatic pressure within the basic working chamber 19''' can continue to remain strongly elevated, so that the basic actuating piston 29''' is to a large extent not displaced into the basic working chamber 19''', which is prevented by the increased pneumatic pressure in the basic working chamber 19'''.

It is clear that the supplementary drive 35''' can also effect a displacement of the valve member 5''' if the basic actuating piston 29''' is not in engaging contact with the basic actuating piston 29'''. Should the basic actuating piston 29''' be in a central position for example, then the pneumatic pressure is to be increased in both chambers 19''', 21'''. Should both chambers 19''', 21''' be loaded with 6 bar for example, then the basic actuating piston is fixed within the basic drive housing part 23''', so that a displacement of the basic drive housing 23''', a displacement of the basic actuating piston 29''' and therefore of the control valve 3''' is achieved. The larger the forces acting on the control valve 3''' are, the larger the pneumatic short circuit between the two chambers 19''' and 21''' should be. In FIG. 4d, the basic actuating piston is illustrated in the closing stop position thereof, in which the fixing of the basic piston is achieved in that only the basic working chamber 19''' is placed under pneumatic pressure. Therefore, the pneumatic inertia at the basic actuating piston 29''' is increased substantially and a displacement of the additional actuating piston 81''' effects a displacement of the entire basic drive 17''' and also the pneumatically fixed basic actuating piston 29''' and therefore the valve member 5'''.

The features disclosed in the above description, the figures, and the claims can be of significance individually as well as in any combination for the realization of the invention in the various embodiments.

REFERENCE LIST 1, 1', 1'', 1''' field device
3, 3', 3'', 3''' control valve
5, 5', 5'', 5''' valve member
7, 7', 7'', 7''' valve seat
8, 8', 8'', 8''' actuating rod
9, 9', 9'', 9''' pneumatic drive
11, 11', 11'', 11''' drive housing
13, 13', 13'', 13''' yoke
14, 14', 14'', 14''' valve-side actuating rod part
15, 15', 15'', 15''' drive-side actuating rod part
16, 16', 16'', 16''' rod connector
17, 17', 17'', 17''' basic drive
18, 18', 18'', 18''' base cover
19, 19', 19'', 19''' basic working chamber
21, 21', 21'', 21''' basic return chamber
23, 23', 23'', 23''' basic drive housing part
25, 25', 25'', 25''' cylindrical outer case
27, 27', 27'', 27''' basic cover
29, 29', 29'', 29''' basic actuating piston
31, 31', 31'', 31''' access channels
32, 32', 32'', 32''' access channels
33, 33', 33'', 33''' access channels
35, 35', 35'', 35''' supplementary drive
37, 37', 37'' pressure spring
39, 39', 39'' support plate
41, 41', 41'' annular flange
42, 42', 42'' guide rod
43, 43', 43'', 43''' supplementary drive housing part
44, 44', 44'', 44''' case section
45, 45', 45'', 45''' supplementary working chamber
47, 47', 47'', 47''' cover part
49, 49', 49'', 49''' piston chamber sliding bearing
51, 51', 51'', 51''' bearing ring
53, 53', 53'', 53''' sealing ring
54, 54', 54'', 54''' sealing ring
55, 55'' supplementary actuating rod
56, 56', 56'', 56''' sealing ring
57, 57'' opening
61, 61'' stop end
63, 63', 63'', 63''' stop peg
71' driver
73, 73''' axial section
75', radial section
77' counterpart driver
79''' supplementary return chamber
81'''' supplementary actuating piston
83''' ring seal
85''' sliding and guide bearing
87''' ring seal
89''' outer side
90''' step
91''' access channel
93''' channel
A axial direction, actuating direction
R radial direction Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A fluid-operated drive for a field device of a processing plant, the drive being designed to set a control valve of the field device, comprising:
a fluidically operated basic drive with a basic working chamber to be loaded fluidically and which is delimited by a basic drive housing part and by a basic actuating piston guided in a fluid-tight manner in the basic drive housing part;
at least one supplementary drive with a supplementary working chamber to be loaded fluidically and delimited by a supplementary drive housing part; and
a supplementary actuating rod fastened to the supplementary drive housing part and extending into an interior of the supplementary drive housing part through a passage integrated in the basic drive housing part, the supplementary actuating rod being guided in a fluid-tight movable manner in the passage,
wherein the supplementary actuating rod has a stop end situated in the basic working chamber and which is brought into loose engagement with the basic actuating piston to transmit a supplementary actuating force of the supplementary drive in a driving manner to the basic actuating piston, and
wherein the basic drive housing part and the supplementary drive housing part are displaceable in one another in accordance with a piston and chamber arrangement so that a volume of the supplementary working chamber changes in the event of a relative movement of the drive housing parts.

2. The fluid-operated drive according to claim 1 in which the supplementary drive housing part and the basic drive housing part are mounted such that they are telescopically displaceable inside one another and the supplementary drive housing part concentrically surrounds the basic drive housing part so that the basic drive housing part occupies and vacates the supplementary working chamber in a piston-like manner.

3. The fluid-operated drive according to claim 1 in which the basic drive housing part or the supplementary drive housing part is fastened to a stationary housing part of the drive which is coupled fixedly to a control valve housing.

4. The fluid-operated drive according to claim 1 in which the supplementary drive housing part is mounted such that it can move relative to the basic drive housing part and has a driver which is brought into driving engagement with a driving stop, which is fastened to an actuating rod fastened to the basic actuating piston, and which is coupled in a force-transmitting manner to the control valve.

5. The fluid-operated drive according to claim 1 in which the supplementary drive housing part has a cylindrical inner side which is at least partially opposite a cylindrical outer side of the basic drive housing part, the cylindrical inner side lying concentric to a longitudinal axis and along which is moved an actuating rod coupled to the control valve.

6. The fluid-operated drive according to claim 1 in which the basic drive comprises:
   a basic return chamber to be loaded fluidically and separated from the basic working chamber by a basic actuating piston;
   the supplementary drive comprises a supplementary return chamber to be loaded fluidically and separated from the supplementary working chamber by a supplementary actuating piston fastened on the basic drive housing part; and
   the supplementary drive having a force actuator which acts in such a manner on the supplementary drive housing part that it is set depending on a fluid pressure prevailing in the supplementary working chamber relative to the basic drive housing part.

7. The fluid-operated drive according to claim 6 wherein the force actuator is supported on an external side of the supplementary drive housing part.

8. The fluid-operated drive according to claim 1 in which a fluid-tight guide is arranged between the basic drive housing part and the supplementary drive housing part for the piston and chamber arrangement.

9. The fluid-operated drive according to claim 8 wherein the fluid-tight guide is formed by a dynamic seal comprising a sealing ring between a housing-part outer and inner side.

10. A field device for a processing plant, comprising:
    a fluid-operated drive and a control valve actuated by the drive; and
    the fluid-operated drive comprising
       a fluidically operated basic drive with a basic working chamber to be loaded fluidically and which is delimited by a basic drive housing part and by a basic actuating piston guided in a fluid-tight manner in the basic drive housing part,
       at least one supplementary drive with a supplementary working chamber to be loaded fluidically and delimited by a supplementary drive housing part, and
       a supplementary actuating rod fastened to the supplementary drive housing part and extending into an interior of the supplementary drive housing part through a passage integrated in the basic drive housing part, the supplementary actuating rod being guided in a fluid-tight movable manner in the passage,
    wherein the supplementary actuating rod has a stop end situated in the basic working chamber and which is brought into loose engagement with the basic actuating piston to transmit a supplementary actuating force of the supplementary drive in a driving manner to the basic actuating piston, and
    wherein the basic drive housing part and the supplementary drive housing part are displaceable in one another in accordance with a piston and chamber arrangement so that a volume of the supplementary working chamber changes in the event of a relative movement of the drive housing parts.

11. A field device of a processing plant, comprising:
    a control valve having an actuating rod; and
    a fluid-operated drive connected to the actuating rod to set the control valve, said fluid-operating drive comprising
       a fluidically operated basic drive with a basic working chamber to be loaded fluidically and which is delimited by a basic drive housing part and by a basic actuating piston guided in a fluid-tight manner in the basic drive housing part,
       at least one supplementary drive with a supplementary working chamber to be loaded fluidically and delimited by a supplementary drive housing part, and
       a supplementary actuating rod fastened to the supplementary drive housing part and extending into an interior of the supplementary drive housing part through a passage integrated in the basic drive housing part, the supplementary actuating rod being guided in a fluid-tight movable manner in the passage,
    wherein the supplementary actuating rod has a stop end situated in the basic working chamber and which is brought into loose engagement with the basic actuating piston to transmit a supplementary actuating force of the supplementary drive in a driving manner to the basic actuating piston, and
    wherein the basic drive housing part and the supplementary drive housing part are displaceable in one another in accordance with a piston and chamber arrangement so that a volume of the supplementary working chamber changes in the event of a relative movement of the drive housing parts.

* * * * *